M. L. Best,
Making Sheet-Metal Vessels.
N° 79,438. Patented June 30, 1868.
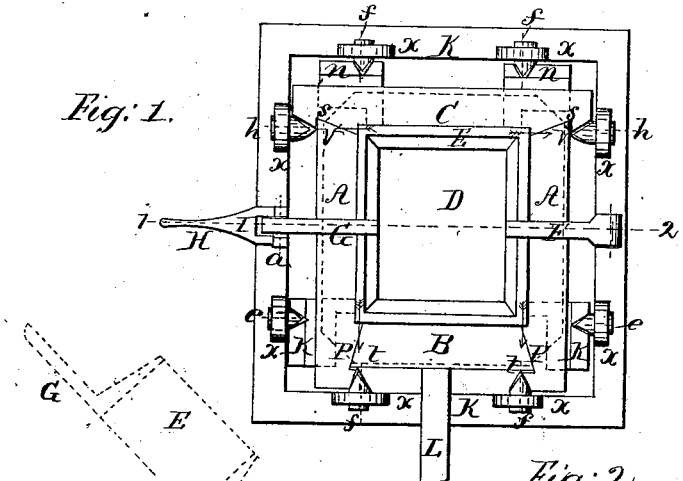
Fig. 1.
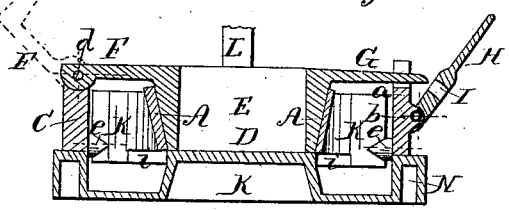
Fig. 2.
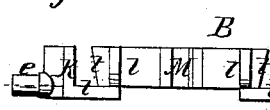
Fig. 3.
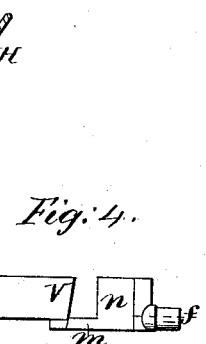
Fig. 4.
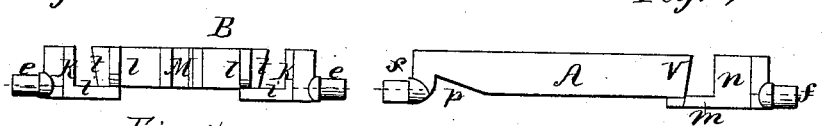
Fig. 5. Fig. 6.
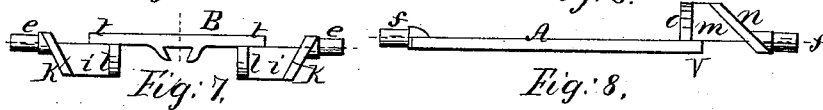
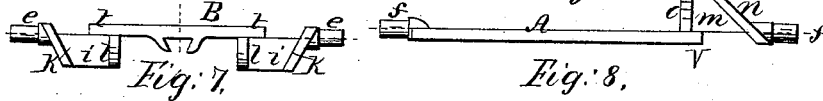
Fig. 7. Fig. 8.
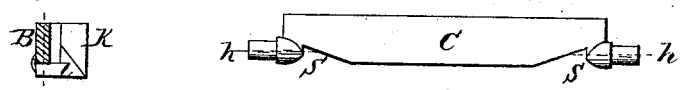
Witnesses:
Ed. A. Beelard
A. W. Heldenhand.
Inventor:
M. L. Best
Job Abbot

United States Patent Office.

M. L. BEST, OF CANTON, ASSIGNOR TO HIMSELF AND J. F. HESS AND BROTHER, OF MASSILLON, OHIO.

Letters Patent No. 79,438, dated June 30, 1868.

IMPROVED MACHINE FOR FORMING BREAD-PANS.

The Schedule referred to in these Letters Patent and making part of the same.

TO ALL WHOM IT MAY CONCERN:

Be it known that I, M. L. BEST, of Canton, in the county of Stark, and State of Ohio, have invented new and useful Improvements in Machines for Forming Bread-Pans; and I do hereby declare that the following is a full, clear, and exact description of my invention, reference being had to the accompanying drawings, forming a part of this specification, and to the letters of reference marked thereon, of which drawings—

Figure 1 is a plan of my improved machine.

Figure 2 is a sectional view, made by plane 1-2 of fig. 1, the forming-plates being shown in an erect position.

Figures 3, 5, and 7 are side view, plan, and sectional view of the principal forming-plate.

Figures 4 and 6 are side view and plan of the second forming-plate.

Figure 8 is a plan of the third forming-plate.

The nature of my invention consists in the peculiar construction and arrangement of two or more forming-plates, which are hung on suitable axes, and so combined with each other that the turning up of the principal plate causes a simultaneous turning up of all the other plates, these plates together turning up the several sides of the pan at the same time, (the sheet metal of which the pan is formed being held in the proper position by suitable clamps,) whereby I greatly facilitate the manufacture of said pans, and thereby lessen their cost.

To enable others skilled in the art to make and use my invention, I will proceed to describe its construction and operation.

The main frame, K, of my machine is of the general form shown, having a centre-block, D, and an outer rim, N, the centre-block D being the lower part of the press or clamps which hold the sheet metal while being formed into a pan.

The die-clamp E is of the same external size and shape as the interior of the pan to be formed, and has an arm, F, by which it is pivoted, by a bolt, $d$, to arm C of the frame K, so that it can be turned up on said bolt as an axis, as shown by dotted lines F E G.

The arm G is attached to the die-clamp E, as shown, and when said die-clamp is down, as shown in figs. 1 and 2, it rests in a slot at the top of the arm $a$ of the frame K, where it is secured by a clamp-lever, H, which is pivoted to the arm $a$ by the bolt $b$, and has a slot, I, formed in it, which, when the lever is brought up to an erect position, admits the end of the arm G, and clamps the die-clamp E on to the block D.

The forming-plates A A B C have the axes $ff$, $ee$, $hh$, which work in boxes $xx$ on the frame K, as shown, said plates being so arranged that when lying down flat, as shown in fig. 1, their upper faces are in the same plane as the upper face of the block D.

The principal forming-plate, B, is made with the axes $ee$, cam-pieces $kk$, and connecting-irons $llii$, the whole being cast together in the form shown.

The socket M is cast on the lower side, and at the centre of the plate B, and in it is inserted the lever L, by which the plate B is turned up and down.

The second forming-plates, A A, are made with the axes $ff$, cam-face $n$, connecting-irons $mo$, and notch $p$, the whole being cast together in the form shown.

These plates B A A are arranged with reference to each other as shown in fig. 1, the ends, $tt$, of the principal plate, B, fitting in the notches $pp$ of the plate A A, while the third forming-plate, C, which is a plain plate, with axes $hh$ and notches $ss$, is arranged with reference to the plates A A as shown, the ends, $vv$, of the plates A A, fitting in the notches $ss$ of the plate C.

The operation of the machine is as follows:

The sheet metal is cut out, of the proper size for making the pan, and is laid on the block D, as indicated by dotted red lines, the die-clamp E being turned up, as shown by dotted lines in fig. 2, and the forming-plates B A A C lying down flat, as shown in fig. 1.

The die-clamp E is then brought down on to the sheet metal, and firmly clamped by the lever H.

The principal plate, B, is then turned up by means of the lever L. This turning up of the plate B turns up the second plates, A A, through the action of the cam-faces $k\ k$ on the outer faces of said plates A A, and this turning up of the plates A A causes the turning up of the third plate, C, through the action of the cam-faces $n\ n$ on the outer face of the plate C.

This simultaneous turning up of the forming-plates causes a similar turning up of the sides of the pan, and bends the surplus metal at the corners of the pan into lips, which stand out from the pan in directions indicated by red arrows, the ends of the plates A A and B being so adjusted, with reference to the plates C and A A, that when said plates are turned up there shall be a sufficient space for the corner lips between the ends $v\ v$ and $t\ t$ of the plates A A and B, and the inside faces of the plates C and A A.

The pan having been thus formed, the plates B A A C are turned down, the clamp-lever H is turned back, and the die-clamp E turned up, when the pan is easily removed, and the corner lips turned down on to the sides or ends of the pan with a hammer.

It is easily seen, from this description, that if the sides of the pan were turned off square, instead of on a bevel, as here shown, the notches $p\ p$ and $s\ s$, in the plates A A and C, would not be needed, as the ends $v\ v$ and $t\ t$ of the plates A A and B would then be made square, instead of bevelled, as shown; and it is also readily seen that the same general construction of the plates may be applied to the forming of a pan with more than four sides, and also to the forming of a sheet-metal corner-piece, or a pan with a bottom and three sides, like the elevators in a grain-separator.

Having thus fully described my improved machine, I wish it understood that I do not claim as my invention the principle of turning up the sides of sheet-metal vessels by means of plates turning in axes, as this has been done before; but

What I do claim as my invention, and desire to secure by Letters Patent, is—

1. The plate A, with cam-face $n$ and connections $m\ o$, when constructed and used in connection with the plate C, substantially in the manner and for the purpose herein specified.

2. The peculiar arrangement and combination of the principal plate, B, with cam-faces $k\ k$ and working-lever L, the plates A A, with cam-faces $n$, the plate C, the block D, and die-clamp E, the several parts being constructed and arranged substantially in the manner and for the purpose herein specified.

3. The peculiar arrangement and combination of the frame K with block D and arms $a$ and $c$, the die-clamp E with arms F and G, and the clamp-lever H with slot I, the several parts being arranged in the manner and for the purpose herein specified.

As evidence I claim the foregoing, I have hereunto set my hand in presence of two witnesses, this 7th day of April, A. D. 1868.

M. L. BEST.

Witnesses:
    ED. N. BEEBOUT,
    JOB ABBOTT.